United States Patent
Lindner et al.

(10) Patent No.: US 10,167,898 B2
(45) Date of Patent: Jan. 1, 2019

(54) SLIDING BEARING COMPRISING AN ALUMINIUM BEARING METAL LAYER

(71) Applicant: FEDERAL-MOGUL WIESBADEN GMBH, Wiesbaden (DE)

(72) Inventors: Karl-Heinz Lindner, Mulheim (DE); Gerd Andler, Bad Schwalbach (DE); Matthias Schnatz, Hochheim am Main (DE)

(73) Assignee: Federal-Mogul Wiesbaden GmbH, Wiesbaden (DE)

( * ) Notice: Subject to any disclaimer, the term of this patent is extended or adjusted under 35 U.S.C. 154(b) by 0 days.

(21) Appl. No.: 14/896,502

(22) PCT Filed: Jun. 6, 2014

(86) PCT No.: PCT/EP2014/061821
§ 371 (c)(1),
(2) Date: Dec. 7, 2015

(87) PCT Pub. No.: WO2014/195458
PCT Pub. Date: Dec. 11, 2014

(65) Prior Publication Data
US 2016/0131186 A1   May 12, 2016

(30) Foreign Application Priority Data
Jun. 7, 2013 (DE) .................. 10 2013 210 662

(51) Int. Cl.
*B32B 15/01* (2006.01)
*F16C 33/12* (2006.01)
*C22C 21/00* (2006.01)

(52) U.S. Cl.
CPC .......... *F16C 33/122* (2013.01); *B32B 15/012* (2013.01); *C22C 21/00* (2013.01);
(Continued)

(58) Field of Classification Search
None
See application file for complete search history.

(56) References Cited

U.S. PATENT DOCUMENTS 4,471,029 A * 9/1984 Fukuoka ............... B32B 15/012
148/415
6,419,769 B1 * 7/2002 Lee ........................ C22C 21/04
148/439

(Continued)

FOREIGN PATENT DOCUMENTS

DE    10135895 A1    4/2002
DE    10246848 B4    12/2006

(Continued)

OTHER PUBLICATIONS

Kenta Suzuki, et al.: Refined Solidification Structure and Improved Formability of A356 Aluminum Alloy Plate Produced using a High-Speed Twin-Roll Strip Caster*1; Materials Transactions, vol. 45, No. 2 (2004) pp. 403 to 406, ©2004 The Japan Institute of Metals.

*Primary Examiner* — Daniel J. Schleis
(74) *Attorney, Agent, or Firm* — Robert L. Stearns; Dickinson Wright, PLLC

(57) ABSTRACT

The invention relates to a sliding bearing composite comprising a carrier layer made of steel, an intermediate layer arranged on the carrier layer and made of aluminum or an aluminum alloy that is lead-free except for impurities, and a bearing metal layer arranged on the intermediate layer and made of an aluminum alloy that is lead-free except for impurities. Said aluminum alloy contains 6.0-10.0 wt. % tin, 2.0-4.0 wt. % silicon, 0.7-1.2 wt. % copper, 0.15-0.25 wt. % chromium, 0.02-0.20 wt. % titanium, 0.1-0.3 wt. % vanadium and optionally less than 0.5 wt. % other elements, the remaining portion being aluminum.

10 Claims, 3 Drawing Sheets

(52) U.S. Cl.
CPC .......... *C22C 21/003* (2013.01); *F16C 33/121* (2013.01); *F16C 2204/20* (2013.01)

(56) References Cited

U.S. PATENT DOCUMENTS

| | | | |
|---|---|---|---|
| 6,471,796 B1 * | 10/2002 | Kagohara | B22D 11/00 |
| | | | 148/551 |
| 2002/0034454 A1 | 3/2002 | Fujita et al. | |
| 2002/0104876 A1 | 8/2002 | Whitney, Jr. et al. | |
| 2003/0102059 A1 | 6/2003 | Kagohara et al. | |
| 2007/0065067 A1 | 3/2007 | Gartner et al. | |
| 2009/0246072 A1 | 10/2009 | Nirasawa et al. | |
| 2011/0277889 A1 * | 11/2011 | Nirasawa | B22D 11/003 |
| | | | 148/552 |
| 2012/0114273 A1 * | 5/2012 | Grooteboer | C22C 21/14 |
| | | | 384/26 |
| 2013/0323524 A1 * | 12/2013 | Andler | B32B 15/012 |
| | | | 428/548 |

FOREIGN PATENT DOCUMENTS

| | | | |
|---|---|---|---|
| DE | 102011003797 | * | 5/2012 |
| DE | 102011003797 B3 | | 5/2012 |
| EP | 1188501 A1 | | 3/2002 |
| EP | 1334285 A1 | | 8/2003 |
| EP | 1764522 A2 | | 3/2007 |
| EP | 2105518 A2 | | 9/2009 |
| EP | 2562282 A1 | | 2/2013 |
| JP | H11209836 | * | 8/1999 |
| JP | H11209836 A | | 8/1999 |
| WO | 02040883 A1 | | 5/2002 |
| WO | 2012107288 A1 | | 8/2012 |

* cited by examiner

SLIDING BEARING COMPRISING AN ALUMINIUM BEARING METAL LAYER

BACKGROUND OF THE INVENTION

1. Technical Field

The invention relates to a sliding bearing composite comprising a carrier layer made of steel, an intermediate layer arranged on the carrier layer and made of aluminum, preferably an aluminum alloy that is lead-free except for impurities, and a bearing metal layer arranged on the intermediate layer and made of an aluminum alloy that is lead-free except for impurities.

2. Related Art

Such slide bearing composites are designed in particular for bearing shells or bushes or thrust washers for use in internal combustion engines of motor vehicles. They are the subject of a variety of publications. Improvement in the bearing metal composition is addressed, for example, in the documents EP 1 334 285 A1, DE 10 2011 003 797 B3, DE 102 46 848 B4 or EP 2 105 518 A2. The aluminum bearing alloy known from the latter document comprises 1.5 to 8 percent by weight Si, 3 to 40 percent by weight Sn, one or more elements from the group consisting of Cu, Zn and Mg in a total amount of 0.1 to 6 percent by weight, optionally one or more elements from the group consisting of Mn, V, Mo, Cr, Ni, Co and B, in a total amount of 0.01 to 3 percent by weight, and the remainder aluminum. The focus of investigation in each writing is on the particle size distribution of the Si particles contained in the finished aluminum bearing alloy product, which is to contain both a percentage of smaller Si particles having a grain size of less than 4 μm as well as larger Si particles having a grain size of 4 to 20 μm in a specific but very wide distribution. With the specified distribution, the tendency of the material to adhere with the sliding partner (susceptibility to seizing) is reduced, and the bonding of the particles in the material is improved. In order to achieve the necessary particle size distribution, the teaching of the text adds the sequence of an annealing step at a temperature of 350° C. to 450° C. over a period of 8 to 24 hours and a subsequent rolling step.

Known from DE 10 2011 003 797 B3 is a slide bearing composite having a carrier layer of steel, an intermediate layer arranged on the carrier layer and a bearing metal layer arranged on the intermediate layer made of an aluminum alloy that is lead-free except for impurities. The aluminum alloy of the bearing metal layer comprises 10.5-14 percent by weight tin, 2-3.5 percent by weight silicon, 0.4-0.6 percent by weight copper, 0.15-0.25 percent by weight chromium, 0.01-0.08 percent by weight strontium and 0.05-0.25 percent by weight titanium. The silicon is present in the form of particles in the bearing metal layer with such a figuration that, with respect to a surface of the bearing metal layer, the area ratio of the silicon particles visible in this surface having a diameter of 4 μm to 8 μm is at least 2.5%. Here, the chemical composition and the hard particles are improved in view of high wear resistance.

Wear resistance continues to be a significant factor in the predominant mixed friction conditions in start-stop applications, so there is always a need for optimization. Furthermore, however, the inventors have taken as an object a simultaneous increase in the fatigue resistance of the bearing material.

SUMMARY OF THE INVENTION

With a sliding bearing composite of the aforementioned type, the invention provides that the aluminum alloy of the bearing metal layer comprises 6.0-10.0 percent by weight tin, 2.0-4.0 percent by weight silicon, 0.7-1.2 percent by weight copper, 0.15-0.25 percent by weight chromium, 0.02-0.20 percent by weight titanium 0.1-0.3 percent by weight vanadium and optionally less than 0.5 percent by weight of other elements, remainder aluminum.

"Lead-free except for impurities" is to be understood in the context of this document that a lead content which could potentially be present due to impurities of the individual alloy elements is at least lower than 0.1 percent by weight.

The inventors have recognized that the bearing metal layer, in particular when using a ductile intermediate layer, can be constructed clearly in the direction of increased fatigue resistance from what is typical in the prior art by means of a specific choice of the tin content in combination with adapted microalloying elements. Therefore, the bearing is not only suitable in the main bearing region, where in start-stop operation increased mixed friction conditions occur, under which no (hydrodynamic) oil lubrication of the bearing is provided, but also as a connecting rod bearing material.

The addition of Ti improves the grain refinement of the matrix material during the casting process, irrespective of a suitable temperature control and suitable degree of deformation in the production of the sliding bearing composite. Through exact adherence to the Ti content of 0.02-0.2 percent by weight, preferably 0.04-0.1 percent by weight, a sufficiently fine grain size of the Al matrix which ensures high strength with good elongation properties of the matrix material can be set at the desired low cooling rates of the casting process with respect to the Si particle size distribution. The particle size distribution of the matrix material has in turn an influence both on the distribution of the Si particles, as the Si dissolves in the Al matrix, as well as on the depositing of the soft phase, i. e. the insoluble Sn along the grain boundaries. For this reason, the Ti content requires a coordination with the proportion of Si and Sn which is as exact as possible.

According to the invention, the latter is present in a range of 6.0 percent by weight to 10.0 percent by weight, preferably from 8.0 to 10.0 percent by weight. In precisely this range, the alloy system of the bearing metal layer has excellent sliding properties and, due to a relatively low content of tin as a soft phase, commands the necessary strength for higher loads, which makes use in mixed friction conditions possible.

With an upper limit of 4 percent by weight, preferably 3 percent by weight, the Si content is capped according to the invention so low that the required ductility of the bearing metal layer in view of the high degree of deformation of the rolling steps is provided. On the other hand, a minimum content of Si particles of 2.0 percent by weight is necessary to be able to employ a sufficient wear resistance of the bearing metal material. By providing Si or Si particles, the size of which are controlled by the heat treatment, the susceptibility to seizure can be greatly reduced, which is again advantageous in mixed friction conditions. In contrast to pure Al intermediate layers, the Si content here is not critical with regard to diffusion processes and the formation of brittle phases.

The Cr content must be considered in relation to the Cu content. Both elements have been found to be particularly important in the aluminum matrix in view of the heat resistance of the material. This is always required in highly loaded applications. The Cr content of 0.15 to 0.25 percent by weight with simultaneous alloying of Cu with a content of 0.7 to 1.2 percent by weight has proven favorable in order to form sufficient strength-increasing depositions in the matrix. On the other hand, a content of 0.25 percent by weight Cr and 1.2 percent by weight Cu should not be exceeded, in order not to in turn negatively affect the formability. Finally, the combination of Cr and Cu works positively insofar as an upper limit of the Cu used of 1.2 percent by weight lowers the cost and increases the recyclability of the material.

Finally, the aluminum alloy of the bearing metal layer comprises 0.1 to 0.3 percent by weight vanadium. Vanadium has an inhibitory effect on the recrystallization of the matrix material, because it raises the recrystallization temperature thereof. Vanadium thus serves to increase heat resistance, which in conjunction with the Ti enables a problem-free setting of a grain size which is adapted to the soft phase and the Si.

The aluminum alloy of the bearing metal layer preferably comprises a 0.2-%-yield strength $R_{p.0.2}$ of more than 90 MPa and a tensile strength $R_m$ of more than 145 MPa, wherein the material parameters at room temperature are determined in a tensile test according to DIN EN ISO 6892-1.

Surprisingly, it has been found that the addition of vanadium causes a significant increase in strength, in particular an increase of the 0.2-%-$R_{p.0.2}$ of more than 60% and in the tensile strength $R_m$ of more than 15%, only in conjunction with a relatively low tin content of 6 to 10 percent by weight. Amazingly, this significant change occurs already at a reduced percentage of 0.2 percent vanadium and a slight decrease in the tin content from 12 percent to 8 percent by weight from the material known from DE 10 2011 003 797 B3, i. e. within a small margin.

The aluminum alloy of the bearing metal layer preferably comprises at least one element selected from the group 0.01-0.08 percent by weight strontium, 0.1-0.2 percent zirconium and 0.1-0.2 scandium.

In addition to the Si content, the particle size distribution of the Si in the bearing metal layer, which in turn is influenced by the chemical composition, is also significant for wear resistance. The inventors have recognized that the targeted addition of a small quantity of Sr in the range of 0.03 to 0.08 percent by weight with the above-mentioned Si content supports the adjustability of the particle size distribution. Together with a low cooling rate after the casting process of <75 K/sec, preferably <50 K/sec, the Sr ensures an optimized particle size distribution with a view to minimizing wear. At the same time, it influences the shape of the Si-particles, which as a result of the Sr content have a more refined and rounded central aspect after casting than could be observed without the addition of Sr. In this way, the formability of the matrix material is not substantially worsened in terms of the subsequent processing steps of heat treatment and rolling by the addition of Si. The Sr content is exactly adjusted in this extent to the Si content.

Preferably, the intermediate layer of the glide bearing element when rolled to its final dimensions comprises a thickness $d_2$ of 25 μm to 70 μm, preferably 25 μm to 50 μm.

The intermediate layer preferably comprises a microhardness of 40 HV 0.01 to 90 HV 0.01.

The Vickers hardness test is carried out in accordance with the European standard EN 6507-1 on the intermediate layer of the finished (formed) glide bearing element. The probe (the indenter) is hereby pressed hereinto in the plane direction of the intermediate layer in a region of a prepared cut edge of the slide bearing element. The cut edge is preferably prepared by grinding.

The silicon in the bearing metal layer is preferably present in the form of particles in the bearing metal layer of such a distribution that 30-70 Si particles >5 μm can be found on a surface of 0.04 mm$^2$.

This particle size distribution has been found to be particularly advantageous, because the Si hard particles >5 μm are sufficiently large to ensure as hard carrying crystals a high wear resistance of the material.

To determine the particle size distribution, a surface section of the bearing metal layer of a certain size is examined under a microscope, preferably at 500× magnification. The bearing metal layer can be examined here in any desired plane, as a substantially homogeneous distribution of Si particles in the layer is assumed, or it is at least assumed that a distribution which is intentionally or unintentionally inhomogeneous, i. e. which for example gradually increases or decreases in a direction, at least does not depart from the claimed limits. The bearing metal layer is preferably prepared in a form such that a flat cut is initially made. The Si particles visible in the surface section are measured in a form such that the longest recognizable dimension is determined and equated with the diameter. Finally, all Si particles in the surface section with a diameter >5 μm are added up, and the number thereof in the total measurement area analyzed is referenced against a standard surface. All Si particles falling in such a class (>5 μm) may also be determined and added up and an average value calculated therefrom.

Particularly preferably, the average Si particle size of all Si particles >5 μm measured in this way is 6-8 μm.

An average diameter of 6 to 8 μm ensures that the particles are not so large that they lead in turn to a reduction in the strength of the matrix, in particular under dynamic stress.

As previously mentioned, the size distribution of the silicon particles is preferably set through a cooling rate after the casting process of less than 75 K/s, more preferably less than 50K/s.

Furthermore, it has surprisingly been found to be advantageous if the tin is present in the bearing metal layer in the form of particles or inclusions in the matrix of such a distribution that on a measurement surface of 1.42 mm$^2$, no more than 50 Sn particles with a surface area of more than 100 μm$^2$ are present.

The preparation of the bearing metal layer for the purpose of measuring the tin distribution is carried out as described above. The Sn particles visible with a scanning electron microscope in a surface section are identified by means of EDX analysis by searching for a gray value range associated with tin within the surface section. Subsequently, the surface ratios of the individual tin particles are determined. To this end, contiguous pixels of the scanning electron microscope image which fall within the gray value range associated with tin are counted. With a known size of the surface section and a known resolution of the image from the scanning electron microscope, the size of an individual pixel is known. The surface area of a tin particle can be determined from the number of contiguous pixels and the pixel size. Finally, the tin particles found on the surface section are divided into size classes, for example <100 μm$^2$ and >100 μm$^2$ or size classes of other increments.

In the case according to the invention, all Sn particles in the surface section with a surface area >100 μm$^2$ are added up, and the number thereof is normalized to the aforementioned standard measurement surface of 1.42 mm$^2$, provided that the examined surface section does not already coincide with the measurement surface.

In particular in high stress bearing applications in internal combustion engines, a polymer-based cover layer is preferably arranged on the bearing metal layer.

Particularly at high loads, the polymer layer leads to a more even load distribution across the entire bearing width. Through the elastic and plastic adaptability of the polymer layer, the operational reliability of the total bearing can hereby be further increased.

THE DRAWINGS

DETAILED DESCRIPTION

Figure 1:
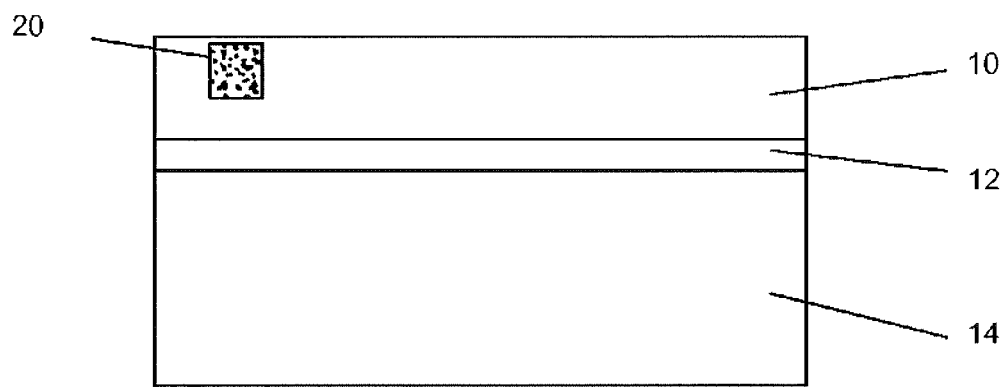
FIG. 1 shows a basic layer structure of a first exemplary embodiment of a sliding bearing composite according to the invention.

FIG. 1 shows a schematic cross section through a sliding bearing composite according to a first embodiment of the invention. It comprises a total of 3 layers. As the topmost layer in FIG. 1 is shown a bearing metal layer which comprises the claimed Al-based composition. The bearing metal layer 10 is applied over an intermediate layer 12 on a support or carrier layer 14 of steel. The intermediate layer serves as a bonding agent between the bearing metal layer 10 and the steel layer. It consists of pure aluminum or an aluminum alloy.

Figure 3:
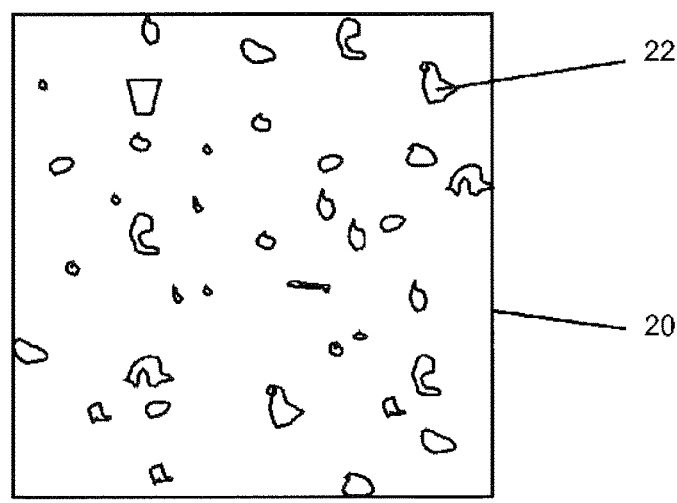
FIG. 3 shows an illustration of the determination of the Si particle size distribution.

In FIG. 1 is further shown symbolically a surface section 20 comprising the inner structure which is enlarged in the illustration of FIG. 3. In order to create an image of such a surface section, a flat cut at a suitable location of the bearing metal layer is preferably prepared. Contrary to the representation in FIG. 1, a surface section can also be considered which is, for example, parallel to the sliding surface.

The thickness of the intermediate layer in the slide bearing composite according to the invention is preferably 25 μm to 70 μm and particularly preferably no more than 50 μm.

Figure 2:
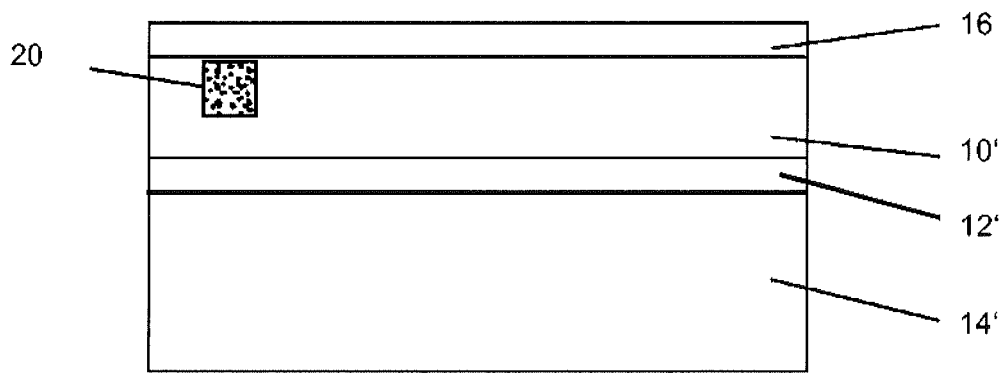
FIG. 2 shows a basic layer structure of a second exemplary embodiment of a sliding bearing composite according to the invention.

The second exemplary embodiment according to FIG. 2 comprises a different layer structure, to the effect that a polymer coating 16 is applied to the bearing metal layer 10', which is particularly advantageous in especially high stress bearing applications.

The invention is not limited to the two embodiments shown. It is equally possible to provide a multilayer arrangement with further functional layers. Gradient layers are also not excluded. In principle, the number and shape of the layers is therefore not limited. However, primarily for the reason of cost-saving mentioned above, a slide bearing composite is preferred which has as few layers as safe operation allows.

The method for determining the Si particle size distribution in the bearing metal layer will be explained below with reference to FIG. 3. After a flat surface grinding of the bearing metal layer is first prepared, which for example extends to the sliding surface, a surface section 20 of the bearing metal layer having a specific edge length and width is selected and marked under a microscope, for example at 500× magnification. If, for example, this is a rectangle with edge lengths of 500 μm and 800 μm, the measured surface is thus 400,000 μm$^2$. In this surface section can be seen a large number of Si particles 22, which according to the invention differentiate themselves optically through a specific gray or color value range from other inclusions, in particular from the soft phase, but also from foreign particles, both of which are not represented here. The detection of the Si particles preferably takes place automatically in an electronic imaging system. The Si particles 22 are measured in such a manner that regardless of form, the longest recognizable dimension thereof is determined. This dimension is designated as the diameter. According to their diameters, the Si particles are divided into classes, for example >5 μm and/or <2 μm, 2-4 μm, 4-6 μm, 6-8 μm, etc.

On this basis, two sizes can preferably be determined: The number of Si particles associated with this class is simply counted and then converted to a standard area of 0.04 mm$^2$ to facilitate comparison. Alternatively or additionally, the particle surfaces of all particles associated with the class can also be determined and added up, and an average value calculated therefrom.

Figure 4:
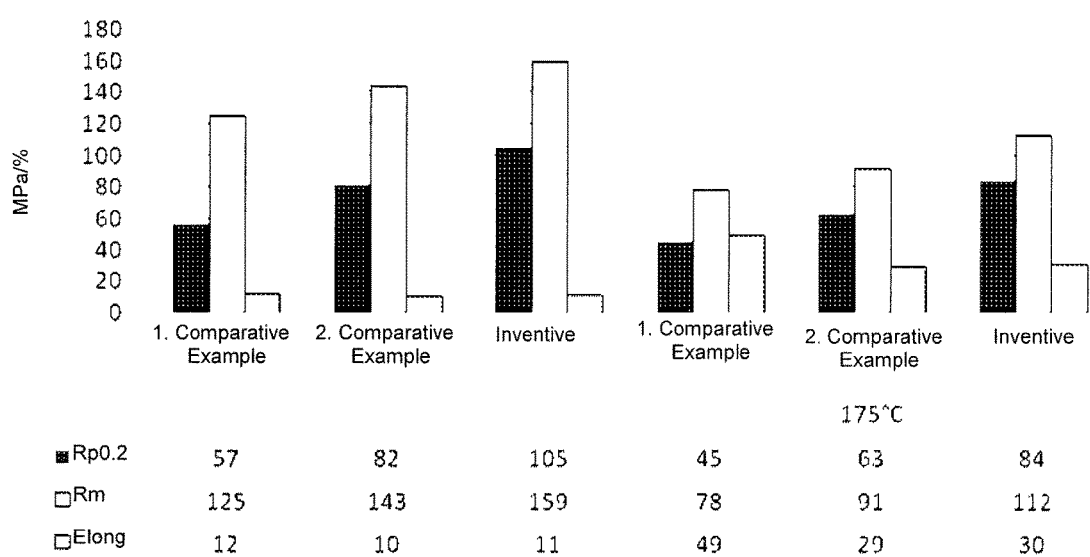
FIG. 4 shows a graph comparing the strength values and elongation at break of the bearing metal alloy in dependence on the content of vanadium and tin.

FIG. 4 shows bar graphs comparing the strength values "yield strength $R_{p.0.2}$" and "tensile strength $R_m$" and the elongation at break "A" for three different compositions of the aluminum alloy of the bearing metal layer at two different test temperatures. The alloys contain the compositions by weight percent which can be seen in table 1:

TABLE 1

|  | Sn | Cu | Fe | Ti | Si | Cr | V | Sr | Al |
| --- | --- | --- | --- | --- | --- | --- | --- | --- | --- |
| 1. State of the Art | 12.57 | 0.40 | 0.10 | 0.056 | 2.37 | 0.17 |  | 0.020 | Remainder |
| 2. Comparative example with vanadium | 13.00 | 0.51 | 0.12 | 0.054 | 2.48 | 0.20 | 0.09 | 0.023 | Remainder |
| 3. inventive embodiment | 10.00 | 0.84 | 0.15 | 0.085 | 2.07 | 0.22 | 0.22 | 0.010 | Remainder |

A bearing metal alloy is selected as the prior art (1. Comparative Example) as is known from DE 10 2011 003 797 B3. On this basis, vanadium was added to the alloy, and this new alloy was tested as a second comparative example. Both examples were compared with an exemplary embodiment of the composition according to the invention with increased Cu content and reduced Sn content. The first comparative example is represented respectively by the left bar graph, the second comparative example by the center bar graph and the exemplary embodiment according to the invention by the right bar graph. Comparisons were carried out once at room temperature, left half of FIG. 4, and at a test temperature of 175° C., right half of FIG. 4.

It was found that a composition of the alloy elements within the scope of the invention, in particular at an increased test temperature of 175° C., led to a significant increase in the tensile strength $R_m$ by more than 40% over the prior art, whereby the elongation of approximately 30% is still sufficiently high.

It was also found that this behavior is the result of a combination of the addition of vanadium with a simultaneous moderate increase of the Cu content and a reduction of the Sn content.

Figure 5:
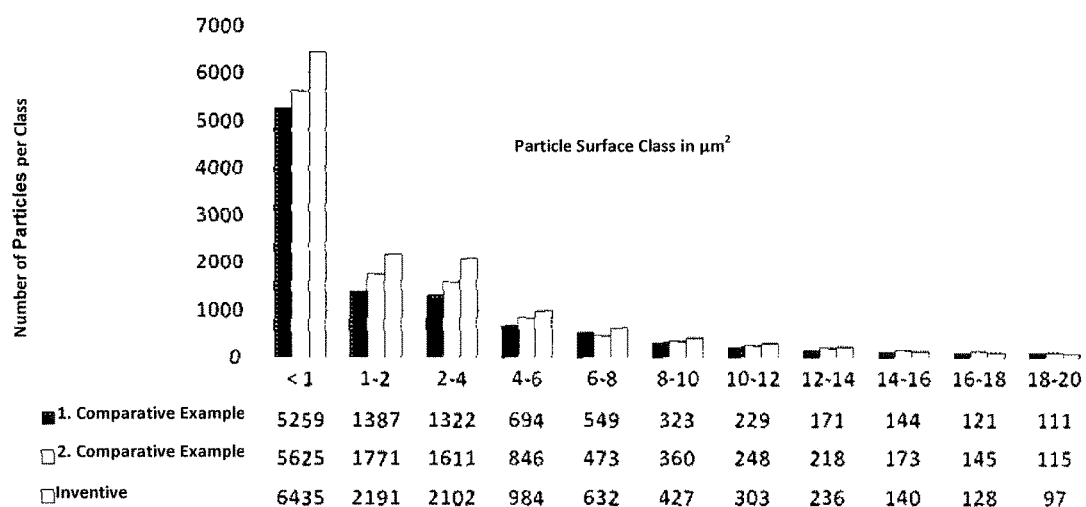
FIG. 5 shows a graph comparing the size distribution of the tin phases in the bearing metal alloy.
Figure 5:
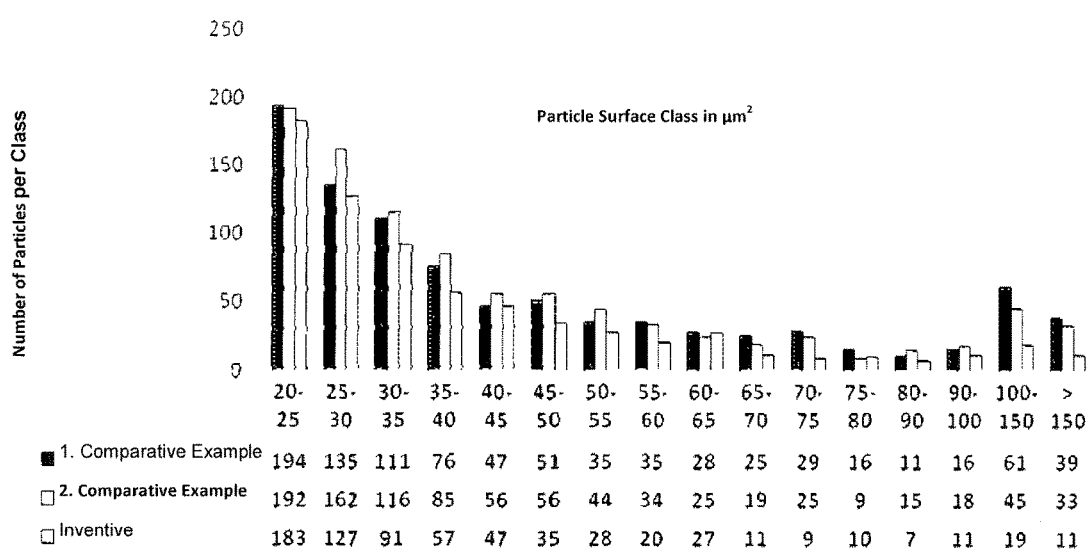

Surprisingly, it was also found that a more refined tin distribution arises in the bearing metal alloy in the composition range according to the invention. This is evidenced by the two graphs of FIG. 5, showing the measured size distribution of the soft phase in the aluminum matrix in the three examples discussed above. The soft phase distribution was determined with the scanning electron microscope (SEM) by means of EDX measurement. Here, the Sn phase is first identified in the grinding based on its characteristic, defined gray value on a specified surface. The chemical composition of the Sn phase determined by means of its gray value is verified by means of EDX analysis. All particles consistent with the gray scale and EDX analysis are then recorded with respect to their size (area) and classified into freely selectable size classes. The result is a microstructure characterization in terms of Sn phase size and its distribution within the classes.

The respective left bar in FIG. 5 shows the number of soft phase particles of a size falling under the class respectively indicated therebelow for the comparative example 1 according to table 1, the center for comparative example 2 according to table 1 and the right for the exemplary embodiment of the invention according to table 1. Below the entries for the size classes, the number is again respectively indicated in tabular form. In the upper diagram of FIG. 5, the classes are shown from <1 $\mu m^2$ to 20 $\mu m^2$ and in the lower diagram from 20 $\mu m^2$ to >150 $\mu m^2$, whereby it is to be noted that the lower diagram comprises a different scaling of the ordinate. The counting and measuring of the Sn phases refers respectively to a surface with a size of 1.42 $mm^2$.

It can be seen that in the alloy according to the invention, significantly more particles are present in the classes <10 $\mu m^2$, whereas particles in the classes >100 $\mu m^2$ are significantly reduced. This is responsible, among other things, for the improved strength. The reason for this is that larger, contiguous Sn areas or particles within the Al matrix lead to a weakening of the structure, as these are present as soft, separate phases (Sn or soft phases), which has a disadvantageous effect under mechanical stress, particularly at elevated temperatures. The tin is therefore preferably distributed in the bearing metal layer such that on a surface of 1.42 $mm^2$, no more than 50 Sn particles can be recognized with a surface area of more than 100 $\mu m^2$.

The specific choice of the alloy elements of the bearing metal alloy surprisingly also has an influence on the Si depositions in the bearing metal layer. The Si size distribution, which is determined as explained with reference to FIG. 3, has in turn a direct influence on strength and wear resistance. Si particles which are too coarse act as inner notches and reduce the strength. At the same time, however, sufficient Si particles in a size range between 2 and 8 $\mu m$ are required in order to ensure the known positive wear resistance of AlSnSi alloys, as Si particles >5 $\mu m$ are sufficiently large, which contribute as hard carrying crystals to the wear resistance of the material. This requirement can be suitably parameterized as follows: The silicon particles in the bearing metal layer are distributed with respect to their diameters such that 30-70 particles >5 $\mu m$ can be found on a surface of 0.04 $mm^2$, the average Si particle size of all measured Si particles having a diameter of >5 $\mu m$ at 6.0-8.0 $\mu m$.

These alloys thus form an excellent compromise for a bearing metal alloy with increased strength, as a result of the special selection of the alloy elements, combined with a refined Sn distribution and a Si distribution which further ensures good wear resistance.

Since the bearing metal surface comes into contact with the opposed piston, the feeding behavior and fatigue resistance are controlled to a first approximation by means of the bearing metal. The inventors have found, however, that the intermediate layer also contributes to the capacity of the bearing. During bearing failure in classic fatigue, cracks run from the surface to the weakest point of the composite. The intermediate layer ensures due to good adaptability that even during roll bonding of the bearing metal to the intermediate layer (cladding) and of the layer system of bearing metal and intermediate layer to the steel (bonding), no bonding issues arise. In addition, the intermediate layer improves the performance of the slide bearing in particular in highly loaded start-stop engines, because it does not experience aging effects, in particular temperature-induced formation of brittle intermetallic AlFe phases at the phase boundary between the steel of the carrier layer and the intermediate layer, for which reason its mechanical characteristics, which are ideally matched to the bearing metal layer in terms of strength and ductility, are permanently retained.

The invention claimed is:

1. A sliding bearing composite comprising a carrier layer made of steel, an intermediate layer arranged on the carrier layer and made of aluminum or an aluminum alloy that is lead-free except for impurities, and a bearing metal layer arranged on the intermediate layer and made of an aluminum alloy that is lead-free except for impurities, which comprises
   6.0-10.0% by weight tin,
   2.0-4.0% by weight silicon,
   0.7-1.2% by weight copper,
   0.15-0.25% by weight chromium,
   0.02 to 0.20% by weight titanium,
   0.1 to 0.3% by weight vanadium,
   0.01-0.08% by weight strontium,
and optionally less than 0.5% by weight of other elements, remainder aluminum, wherein the tin is present in the bearing metal layer in the form of particles of such a distribution that on a surface of 1.42 mm2, no more than 50 Sn particles with a surface area of more than 100 $\mu m2$ are present, wherein the silicon is present in the bearing metal layer in the form of particles of such a distribution that 30-70 Si particles >5 $\mu m$ are present on a surface of 0.04 mm2, the average Si particle size of all measured Si particles having a diameter of >5 $\mu m$ is 6.0-8.0 $\mu m$, wherein the aluminum alloy of the bearing metal layer comprises a 0.2-%-yield strength Rp, 0.2 of more than 90 MPa and a tensile strength of more than 145 MPa.

2. The sliding bearing composite according to claim 1, wherein the aluminum alloy of the bearing metal layer comprises at least one element selected from the group 0.1-0.2% zirconium and 0.1-0.2 scandium.

3. The sliding bearing composite according to claim 1, wherein the proportion of tin in the aluminum alloy of the bearing metal layer is 8.0-10.0% by weight.

4. The sliding bearing composite according to claim 1, wherein the proportion of silicon in the aluminum alloy of the bearing metal layer is 2.0-3.0% by weight.

5. The sliding bearing composite according to claim 1, wherein the proportion of titanium in the aluminum alloy of the bearing metal layer is 0.04-0.10% by weight.

6. The sliding bearing composite according to claim 1, wherein the size distribution of the silicon particles in the bearing metal layer is set through a cooling rate after the casting process of less than 75 K/s.

7. The sliding bearing composite according to claim 1, wherein the intermediate layer comprises a thickness d2 of 25-70 μm.

8. The sliding bearing composite according to claim 1, wherein the intermediate layer comprises a microhardness of 40 HV 0.01-90 HV 0.01.

9. The sliding bearing composite according to claim 1, wherein a polymer-based cover layer is arranged on the bearing metal layer.

10. The sliding bearing composite according to claim 1, wherein the silicon in the bearing metal layer is present in the form of particles, and the size distribution of the silicon particles in the bearing metal layer is set through a cooling rate after the casting process of less than 50 K/s.

\* \* \* \* \*